Patented Aug. 22, 1944

2,356,459

UNITED STATES PATENT OFFICE 2,356,459

PREPARATION OF BETA LACTONES

Frederick E. Küng, Akron, Ohio, assignor to The B. F. Goodrich Company, New York, N. Y., a corporation of New York No Drawing. Application May 15, 1941, Serial No. 393,671

12 Claims. (Cl. 260—344)

This invention relates to a process for the preparation of beta hydroxy carboxylic acid lactones which comprises reacting a carbonyl compound such as an aldehyde or a ketone with a ketene. The invention is particularly applicable to the preparation of low molecular weight lactones of beta hydroxy aliphatic acids which heretofore have been obtained only with great difficulty and in very low yields, and which are of value as intermediates in the preparation of a number of useful polymerizable compounds.

Although ketenes have already been reacted with aldehydes and ketones it has not been possible to carry out the reaction so as to yield a monomeric lactone. When low molecular weight aliphatic ketenes and low molecular weight aliphatic carbonyl compounds have been employed as reactants only polymeric material of uncertain chemical structure has been obtained and, on the other hand, when higher molecular weight aliphatic or aromatic reactants have been employed, the products are a hydrocarbon and carbon dioxide.

I have now discovered that ketenes react with carbonyl compounds to yield lactones of beta hydroxy acids in accordance with the following reaction and that the lactones so formed may be isolated as such and obtained in good yields.

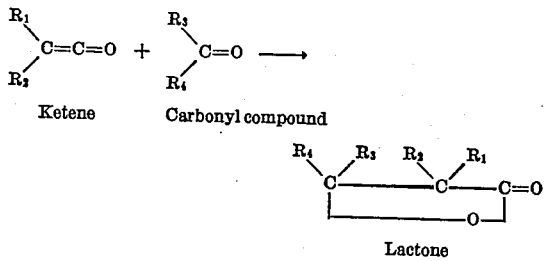

Ketene    Carbonyl compound

Lactone

As shown by the equation above this invention contemplates the reaction of a ketene, that is a compound having the formula

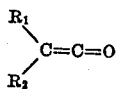

wherein $R_1$ and $R_2$ represent hydrogen or hydrocarbon radicals, with a compound containing a carbonyl group as the sole functional group, that is a compound of the formula

wherein $R_3$ and $R_4$ represent hydrogen or hydrocarbon radicals free from olefinic and acetylenic bonds, to form a lactone of a beta hydroxy carboxylic acid. The parent compound ketene, $CH_2=C=O$, is preferably employed as the ketene in this reaction but its aliphatic and aromatic homologs including the aldo-ketenes such as methyl ketene, ethyl ketene, propyl ketene, butyl ketene and phenyl ketene, as well as the keto-ketenes such as dimethyl ketene, diethyl ketene, dipropyl ketene, diphenyl ketene or the like may also be employed. The carbonyl compound may be any compound containing as its sole functional group the characteristic carbonyl group present in an open chain structure and linked to two other radicals by single valencies as,

Thus, the carbonyl compound will be an aldehyde of the formula

wherein $R_3$ is hydrogen, an alkyl radical (that is, a saturated aliphatic open chain hydrocarbon radical of the formula $C_nH_{2n+1}$), an aryl radical (that is, a univalent aromatic hydrocarbon radical whose free valence is connected to the aromatic ring) free from olefinic and acetylenic bonds, an aralkyl radical (that is an alkyl radical having one or more hydrogens replaced by aryl radicals) free from olefinic and acetylenic bonds or a cycloalkyl radical (that is, a univalent hydrocarbon radical derived by the removal of a hydrogen atom from a cycloparaffin); or a ketone of the formula

wherein both $R_3$ and $R_4$ are alkyl, aryl, aralkyl or cycloalkyl radicals of the type defined above. Examples of such aldehydes and ketones include formaldehyde, acetaldehyde, propionaldehyde, butyraldehyde, benzaldehyde, acetone, methyl ethyl ketone, diethyl ketone, dipropyl ketone, benzophenone, acetophenone or the like.

As examples of the reaction of this invention, formaldehyde may be reacted with ketene to form hydracrylic lactone (beta hydroxy propionic acid lactone) which is useful in the preparation of acrylic acids, esters and nitriles; acetaldehyde may be reacted with ketene to form beta hydroxy butyric acid lactone; acetone may be reacted with ketene to form beta hydroxy isovaleric acid lactone; formaldehyde may be reacted with methyl ketene to form alpha methyl beta hydroxy propionic acid lactone which may be used to prepare methacrylic acid derivatives; and many other useful reactions and syntheses are made possible by this invention.

The method of carrying out the reaction and of isolating the lactone formed will depend somewhat upon the particular reactants employed and upon the properties of the lactone produced. In general, however, because of the great reactivity of ketenes and lower aldehydes and their tendency to polymerize and/or decompose and because of the relative instability of beta lactones, it is desirable to carry out the reaction under mild conditions such as in presence of a solvent or diluent for the reaction and at a low temperature, and to isolate the lactone under conditions which avoid its decomposition such as by distilling it at reduced pressure. It is also desirable to make use of a catalyst, preferably a Friedel-Crafts type catalyst in the reaction of the ketene with the carbonyl compound.

The following examples will illustrate the practice of the invention:

Example 1

Gaseous ketene is prepared by the pyrolysis of acetone with an electrically heated (red hot) platinum spiral. Gaseous monomeric formaldehyde is prepared by heating a polymerized formaldehyde such as trioxymethylene or paraformaldehyde to a temperature of about 140–160° C. The temperature of the formaldehyde vapor is maintained sufficiently high to prevent polymerization on the walls of the conduit. The gaseous ketene and the gaseous formaldehyde are then mixed (this dilution further preventing the polymerization of the formaldehyde) and led at the rate of ⅓ gram-mole of each reactant per hour into a stirred solution of .5 ml. of boron fluoride ethyl ether complex, as catalyst, in 40 grams of acetone at a temperature of −60° C. The passage of gaseous reactants into the solution is continued for 1½ hrs. by which time 0.50 gram-mole of each reactant has been added. Immediately after addition of the reactants and while still maintaining the low temperature, 0.6 g. of sodium hydroxide in 3 cc. of water is added to the reaction mixture to decompose the catalyst and the reaction mixture is distilled at reduced pressure. After the solvent is removed, 23 g. of hydracrylic acid lactone B.P.$_{4mm.}$ 37°–40° C. is obtained. This represents a 64% yield of the lactone.

Example 2

Formaldehyde at the rate of 0.5 mole per hour and ketene at the rate of 0.46 mole per hour are generated as in Example 1, mixed in the gaseous phase and the gaseous mixture passed into 100 ml. of acetone containing 0.5 g. zinc chloride as catalyst with stirring at 7°–10° C. After 3 hours 0.5 g. of sodium hydroxide in 1 ml. of water is added and the mixture is distilled at reduced pressure. Hydracrylic acid lactone is obtained in 90% yield. The product has a melting point of −35° C., B.P.$_{10 mm.}$ 49°–51° C., a refractive index at 26° of 1.410, and a density at 26° of 1.144. The material is of high purity since on carbon and hydrogen analysis the following results are obtained:

|  | Calculated | Found |
| --- | --- | --- |
|  | Per cent | Per cent |
| Carbon | 50.0 | 49.8 |
| Hydrogen | 5.55 | 5.65 |

Example 3

A solution containing 2 ml. of a boron fluoride ethyl ether complex catalyst in 50 ml. of ethyl ether is prepared and to this solution a solution of 22 g. (.5 mole) of acetaldehyde in ether and .45 mole of gaseous ketene are simultaneously added in a period of about one hour while stirring the solution and maintaining its temperature between 10° and 15° C. A caustic solution containing 2 g. of NaOH in 4 ml. of water is then added to decompose the catalyst; and the reaction mixture is distilled first at atmospheric pressure to remove the excess solvent and then at reduced pressure. Redistillation of the product at reduced pressure yields 26.5 g. (70%) of purified beta-hydroxy butyric acid lactone.

The above examples illustrate preferred conditions for the production of hydracrylic lactone and its homologues from ketene and low molecular aldehydes. However many modifications in these conditions may be effected without essentially altering the process. Variations in the catalyst for the reaction includes the use of many substances known to promote Friedel-Crafts reactions including, for examples, the halides of boron, zinc, aluminum, tin, titanium and iron or complexes of these halides with organic compounds such as ethyl ether, ethyl chloride or the like. All such halides and their complexes which are known to the art to catalyze the well known Friedel-Crafts type reaction, are designated herein as "Friedel-Crafts catalysts." The amount of catalyst used may be varied somewhat but it is usually desirable to employ from 0.1 to 0.5 gram of the catalyst for each mole of reactant. It is desirable in most cases that the catalyst be decomposed after the lactone is formed if it is desirable to isolate the lactone by distillation since in presence of catalyst and heat the lactone may polymerize.

As a solvent for the reaction in addition to acetone and ether, any of the common organic solvents which dissolves both the reactants and which is itself relatively inert to the reactants may be employed. Methyl ethyl ether, ethyl chloride, isopropyl chloride, carbon disulfide, dioxane or the like may be mentioned as suitable solvents. Although acetone and methyl ethyl ketone also react with ketene, they may be employed as solvents for the ketene formaldehyde reaction since this reaction is much more rapid than the reaction of ketene with the ketone. In the event acetone or methyl ethyl ketone or the like is employed as a reactant it may be added in excess quantities and thereby also serve as the solvent. Since low temperatures are generally employed for the reaction, solvents which are easily maintained at low temperatures are especially desirable.

As mentioned hereinabove it is usually advisable to employ low temperatures for the reaction. Temperatures lower than room temperature that is, lower than about 25° C., are usually desirable and in many cases, especially when boron fluoride ethyl ether complex is employed as the catalyst, it is preferred to carry out the reaction at a temperature somewhat below 0° C., and in the case of the reaction of ketene and formaldehyde with this catalyst, a temperature of −40° to −60° C. is best.

An excess of ether of the reactants, that is, of the ketene or of the carbonyl compound may be used if desired but the employment of about equimolecular proportions of the two reactants usually results in highest yields. This is especially true in the case of the reaction of ketene with formaldehyde since an excess of ketene leads to the formation of the dimer, diketene, and an excess of formaldehyde leads to its polymerization.

Other modifications in the reaction conditions may be made when employing other reactants than those used in the examples above. Ordinarily it will not be necessary to prepare either of the reactants in the gaseous phase and then pass the gases into a solvent for the reaction as was done in Examples 1 and 2 with both formaldehyde and ketene and in Example 3 with ketene, for in other examples simply dissolving one of the reactants in a solvent and then adding the other reactant or a solution of the other reactant is the most convenient way of conducting the reaction.

The isolation of the lactone formed by the reaction of this invention is also subject to considerable variation depending upon the particular lactone produced by the reaction. The problem encountered in isolating the lactone is to separate the lactone from the reaction mixture in such a way that it does not polymerize or decompose. Low molecular weight aliphatic lactones have a tendency to polymerize when heated at atmospheric pressure, especially in presence of a condensation catalyst. Hence, when such lactones are produced, the catalyst should be destroyed and then the lactone distilled under reduced pressure or the lactone should be isolated in some other way which avoids polymerizing conditions. Higher molecular weight aliphatic lactones, aromatic lactones and substituted lactones do not polymerize so readily but they may decompose when heated into carbon dioxide and a hydrocarbon. Here again, therefore, the lactone should be isolated under conditions which avoid decomposition as by distilling under reduced pressure, by crystallization, by filtration or in some other convenient manner depending upon the properties of the lactone.

As mentioned hereinabove the lactones produced by the process of this invention find many applications in the production of other compounds, particularly unsaturated polymerizable compounds which are of considerable importance in the production of synthetic resins, synthetic rubber and the like.

Although the invention has been described in relation to preferred embodiments and certain variations and modifications have been herein pointed out, numerous other modifications will be apparent to those skilled in the art. Hence it is not intended that the invention be limited except by the spirit and scope of the appended claims.

I claim:

1. The process which comprises reacting a ketene of the formula

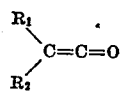

wherein $R_1$ and $R_2$ represent a radical of the class consisting of hydrogen and hydrocarbon radicals, with a compound of the formula

wherein $R_3$ and $R_4$ represent a radical of the class consisting of hydrogen and hydrocarbon radicals free from olefinic and acetylenic bonds at a temperature below about 25° C. and in the presence of a Friedel-Crafts type catalyst, and obtaining as the principal product of the reaction a beta hydroxy carboxylic acid lactone.

2. The process which comprises reacting a low molecular weight aliphatic ketene of the formula

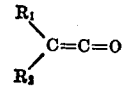

wherein $R_1$ and $R_2$ represent a radical of the class consisting of hydrogen and hydrocarbon radicals, with a low molecular weight, unsubstituted, saturated aliphatic aldehyde at a temperature below about 25° C. and in the presence of a Friedel-Crafts catalyst, and obtaining as the principal product of the reaction a monomeric beta-hydroxy carboxylic acid lactone.

3. The process which comprises reacting a ketene of the formula

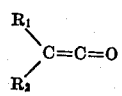

wherein $R_1$ and $R_2$ represent a radical of the class consisting of hydrogen and hydrocarbon radicals, with a low molecular weight ketone of the formula

wherein $R_3$ and $R_4$ represent alkyl radicals, at a temperature below about 25° C. and in the presence of a Friedel-Crafts catalyst, and obtaining as the principal product of the reaction a monomeric beta-hydroxy carboxylic acid lactone.

4. The process which comprises reacting ketene with a low molecular weight ketone of the formula

wherein $R_3$ and $R_4$ represent alkyl radicals, at a temperature below about 25° C. and in the presence of a Friedel-Crafts catalyst, and obtaining as the principal product of the reaction a monomeric beta-hydroxy carboxylic acid lactone.

5. The process which comprises reacting ketene with a low molecular weight, unsubstituted, saturated aliphatic aldehyde at a temperature below about 25° C. and in the presence of a Friedel-Crafts catalyst, and obtaining as the principal product of the reaction a monomeric beta hydroxy carboxylic acid lactone.

6. The process which comprises reacting ketene with a low molecular weight, unsubstituted, saturated aliphatic aldehyde in a mutual solvent at a temperature below about 25° C. in the presence of a Friedel-Crafts type catalyst, and obtaining as the principal product of the reaction a monomeric beta hydroxy carboxylic acid lactone.

7. The process which comprises reacting ketene with formaldehyde in a mutual solvent at a temperature below about 25° C. in the presence of a Friedel-Crafts type catalyst, and obtaining as the principal product of the reaction monomeric beta hydroxy propionic acid lactone.

8. The process which comprises reacting ketene with formaldehyde at a temperature below about 25° C. and in the presence of a Friedel-Crafts catalyst and obtaining as the principal product of the reaction monomeric beta hydroxy propionic acid lactone.

9. The process which comprises reacting a low molecular weight aliphatic ketene of the formula

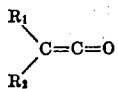

wherein $R_1$ and $R_2$ represent a radical of the class consisting of hydrogen and hydrocarbon radicals with a low molecular weight, unsubstituted, saturated aliphatic aldehyde in a mutual solvent at a temperature below about 25° C. and in presence of a zinc chloride catalyst to form a monomeric beta hydroxy carboxylic acid lactone, and isolating the lactone so formed by distillation at reduced pressure.

10. The process which comprises reacting a low molecular weight aliphatic ketene of the formula

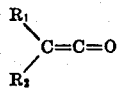

wherein $R_1$ and $R_2$ represent a radical of the class consisting of hydrogen and hydrocarbon radicals with a low molecular weight, unsubstituted, saturated aliphatic aldehyde in a mutual solvent at a temperature below 0° C. and in presence of a boron fluoride catalyst to form a monomeric beta hydroxy carboxylic acid lactone, and isolating the lactone so formed by distillation at reduced pressure.

11. The process which comprises reacting ketene with formaldehyde in a mutual solvent at a temperature below about 25° C. and in presence of a zinc chloride catalyst to form monomeric beta hydroxy propionic acid lactone, and isolating the lactone so formed by distillation at reduced pressure.

12. The process which comprises passing a gaseous mixture of ketene and formaldehyde into a mutual solvent containing a boron fluoride catalyst, allowing reaction to occur at a temperature of —20 to —60° C., decomposing the catalyst and thereafter separating the monomeric beta hydroxy propionic acid lactone so formed by distillation at reduced pressure.

FREDERICK E. KÜNG.